United States Patent
Yoo

(10) Patent No.: US 8,229,345 B2
(45) Date of Patent: Jul. 24, 2012

(54) DIGITAL BROADCAST RECEIVING APPARATUS AND METHOD THEREOF

(75) Inventor: Hoon Yoo, Suwon-si (KR)

(73) Assignee: Samsung Electronics Co., Ltd (KR)

(*) Notice: Subject to any disclaimer, the term of this patent is extended or adjusted under 35 U.S.C. 154(b) by 1571 days.

(21) Appl. No.: 11/109,910

(22) Filed: Apr. 20, 2005

(65) Prior Publication Data

US 2006/0057957 A1 Mar. 16, 2006

(30) Foreign Application Priority Data

Sep. 10, 2004 (KR) .................. 10-2004-0072577

(51) Int. Cl.
*H04H 20/71* (2008.01)
(52) U.S. Cl. .............. 455/3.01; 455/3.06; 725/94
(58) Field of Classification Search ........ 455/3.01–3.06; 725/92–94, 100
See application file for complete search history.

(56) References Cited

U.S. PATENT DOCUMENTS

| | | | |
|---|---|---|---|
| 6,016,172 A | 1/2000 | Huh | |
| 6,078,988 A * | 6/2000 | Komori | 711/112 |
| 6,175,595 B1 | 1/2001 | Keesman | |
| 6,188,729 B1 | 2/2001 | Perkins | |
| 6,351,474 B1 * | 2/2002 | Robinett et al. | 370/486 |
| 6,775,257 B1 * | 8/2004 | Watanabe | 370/335 |
| 7,095,945 B1 * | 8/2006 | Kovacevic | 386/12 |
| 2002/0034376 A1 * | 3/2002 | Katayama et al. | 386/96 |
| 2002/0129374 A1 | 9/2002 | Freeman et al. | |
| 2002/0131443 A1 | 9/2002 | Robinett et al. | |
| 2002/0184637 A1 | 12/2002 | Perlman | |
| 2004/0205166 A1 * | 10/2004 | DeMoney | 709/219 |
| 2005/0278774 A1 * | 12/2005 | Eshleman et al. | 725/153 |

FOREIGN PATENT DOCUMENTS

| | | |
|---|---|---|
| CN | 1293845 | 5/2001 |
| EP | 1043877 A1 * | 10/2000 |
| EP | 1107601 | 6/2001 |
| EP | 1115252 | 7/2001 |
| EP | 1 182 887 | 2/2002 |
| JP | 08-056205 | 2/1996 |
| JP | 2002-084511 | 3/2002 |

* cited by examiner

*Primary Examiner* — Raymond Dean
(74) *Attorney, Agent, or Firm* — The Farrell Law Firm, P.C.

(57) ABSTRACT

A digital broadcast receiving apparatus and a method thereof are disclosed. The digital broadcast receiving apparatus includes a demultiplexer for separating a multichannel transport stream into a plurality of broadcasting channel data and outputting the broadcasting channel data, a buffer unit, including a plurality of buffers having different capacities that correspond to data bit rates, for storing the broadcasting channel data in the buffers having the corresponding capacities, respectively, according to the data bit rates, a user interface for outputting channel identification information corresponding to the broadcasting channel selected by a user, and a switching device for selecting one of outputs of the plurality of buffers according to the channel identification information.

5 Claims, 5 Drawing Sheets

240

| Service ID | PMT PID | AUD PID | CDM | Bitrate (kbps) | ... |
|---|---|---|---|---|---|
| ... | ... | ... | ... | ... | ... |
| 60 | 0x0080 | 0x1950 | 26 | 64 | ... |
| 61 | 0x0081 | 0x1951 | 26 | 48 | ... |
| 62 | 0x0082 | 0x1952 | 28 | 48 | ... |
| ... | ... | ... | ... | ... | ... |

FIG.3

DIGITAL BROADCAST RECEIVING APPARATUS AND METHOD THEREOF

PRIORITY

This application claims priority to an application entitled "Digital Broadcast Receiving Apparatus and Method Thereof" filed in the Korean Industrial Property Office on Sep. 10, 2004 and assigned Serial No. 2004-72577, the contents of which are hereby incorporated by reference.

BACKGROUND OF THE INVENTION

1. Field of the Invention

The present invention relates to a digital broadcast receiving apparatus and a method thereof.

2. Description of the Related Art

With the development of digital broadcasting technology and mobile communication technology, the provision of digital broadcasts to a mobile user has become an increasing matter of concern. Digital multimedia broadcasting (hereinafter referred to as a "DMB") is a broadcasting service that enables a user to view diverse multimedia broadcasts on multiple channels using a personal portable receiver or a mobile vehicle receiver. Particularly, the satellite DMB adopted in Korea selects a CDM (Code Division Multiplexing) technology that is similar to a CDMA mobile phone as the Standard Rec. BO.1130-4: System-E of ITU (International Telecommunication Union).

In existing digital broadcast receiving apparatuses, a buffer is filled with broadcasting program data before providing the program to the user through a speaker and a display unit. The time it takes to actually view a selected program includes the time it takes to respond to user input, via a keypress, plus the time it takes to buffer the program. In effect, the time required for selecting the broadcasting channel in the digital broadcasting corresponds to the size of the buffer.

In such a DMB system, a plurality of broadcasting channels having different bit rates may be allocated to one transmission channel. For example, in the case of an audio broadcasting, four broadcasting channels of 64 Kbps, 48 Kbps, 48 Kbps and 32 Kbps are allocated to a certain transmission channel, and four broadcasting channels of 48 Kbps, 40 Kbps, 32 Kbps and 32 Kbps are allocated to another transmission channel. The minimum bit rate of the broadcasting channel is 24 Kbps.

For practical applications, the digital broadcast receiving apparatus should include a buffer sufficient for the largest bit rate. For example, a buffer having a size corresponding to the buffering of the 64 Kbps broadcasting channel data for two seconds requires a 5.33-second buffering time in buffering the 24 Kbps broadcasting channel data. If the time required to fill half of this buffer with the 64 Kbps broadcasting channel data is one second, the time required to fill half of this buffer with the 24 Kbps broadcasting channel data is 2.67 seconds.

As described above, in the digital broadcast receiving apparatus, the buffer-filling times are different from one another according to selected broadcasting channels, and this causes the waiting time (time to output the broadcasting channel data) to be different according to the selected broadcasting channel. Where the audio broadcasting channel buffer for the maximum bit rate is also used for the minimum bit rate, it increases the waiting time for broadcasting channel selection and output.

SUMMARY OF THE INVENTION

Accordingly, the present invention has been designed to solve the above and other problems occurring in the prior art, and provides a digital broadcast receiving apparatus and a method thereof that can reduce the time required for broadcasting channel selection in receiving a digital broadcast.

The present invention also provides a digital broadcast receiving apparatus and a method thereof that can select a broadcasting channel at high speed in a digital broadcasting.

In one aspect of the present invention, there is provided a digital broadcast receiving apparatus which includes a demultiplexer for separating a multichannel transport stream into a plurality of broadcasting channel data and outputting the broadcasting channel data, a buffer unit, including a plurality of buffers having different capacities that correspond to data bit rates, for storing the broadcasting channel data in the buffers having the corresponding capacities, respectively, according to the data bit rates, a user interface for outputting channel identification information corresponding to the broadcasting channel selected by a user, and a switching device for selecting one of outputs of the plurality of buffers according to the channel identification information.

BRIEF DESCRIPTION OF THE DRAWINGS

The above and other objects, features and advantages of the present invention will be more apparent from the following detailed description taken in conjunction with the accompanying drawings, in which:

FIG. 3 is a view illustrating the structure of a database according to an embodiment of the present invention;

DETAILED DESCRIPTION OF THE PREFERRED EMBODIMENTS

Preferred embodiments of the present invention will be described in detail hereinafter with reference to the accompanying drawings. In the following description of the present invention, only the parts for understanding the operation of the present invention will be explained, but a detailed description of known functions and configurations incorporated herein will be omitted when it may obscure the subject matter of the present invention.

Figure 1:
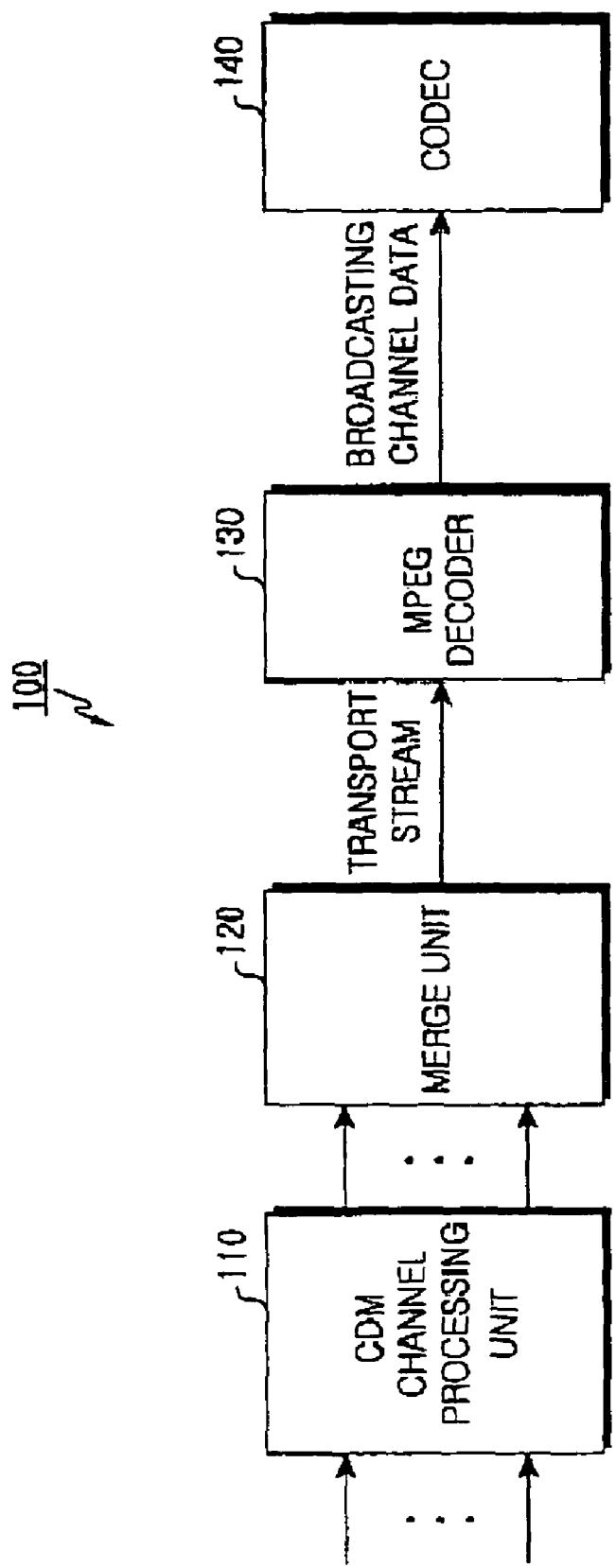
FIG. 1 is a block diagram illustrating the construction of a digital broadcast receiving apparatus according to a preferred embodiment of the present invention.

FIG. 1 is a block diagram illustrating the construction of a digital broadcast receiving apparatus according to a preferred embodiment of the present invention. In the following description of the present invention, it is assumed that a digital audio broadcast from among digital multimedia broadcasts is received. Referring to FIG. 1, the digital broadcast receiving apparatus 100 according to the preferred embodiment of the present invention includes a CDM (Code Division Multiplexing) channel processing unit 110 for deinterleaving and outputting CDM channel data received through at least one CDM channel CDM0 to CDMN, a merge unit 120 for merging the CDM channel data and generating a transport stream, an MPEG decoder 130 for MPEG-decoding the transport stream from the merge unit 120 and outputting specified broadcasting channel data, and a codec 140 for converting a digital signal that is the broadcasting channel data provided from the MPEG decoder 130 into audio and video signals.

The CDM channel processing unit 110 is constructed to receive and process about five CDM channels. Essentially, the CDM channel processing unit 110 receives a channel for transmitting pilot information, a channel for transmitting EPG (Electronic Program Guide) information and a channel for transmitting CAS (Conditional Access System) information. Additionally, the CDM channel processing unit 110 can actually receive at least one CDM transmission channel for transmitting broadcasting channel data.

In this case, the number of CDM channels that can be decoded by the digital broadcast receiving apparatus is generally smaller than the number of CDM channels provided from the DMB system. For example, according to the transmission/reception standard of a satellite DMB of, such as the ARIB STD B41—a collection of satellite DMS transmitting standards suggested by the Association of Radio Industries and Businesses (ARIB) in Japan—the DMB system uses thirty channels in a manner that it transmits data through twenty-nine channels and transmits a control signal through one channel. Data of 512 Kbps is transmitted through each of the twenty-nine channels for transmitting data. Since the data of 512 Kbps becomes the data of 256 Kbps through a 1/2-convolution coding and then becomes the data of about 236 (=188/204) Kbps through an R-S coding, effective data of about 236 Kbps can be transmitted through each channel. Accordingly, the satellite DMB system can transmit data of about 6.844 Mbps in all, since twenty-nine channels exist. In the future, the digital broadcast receiving apparatus may be constructed to process five or more CDM transmission channels, and the present invention can be applied to this digital broadcast receiving apparatus as well.

The DMB system can transmit an AV (Audio/Video) broadcasting channel data through two CMD transmission channels instead of one CMD transmission channel. In the case of an audio broadcasting channel, multiple audio broadcasting channel data can be served through one transmission channel. The audio broadcasting channel data capacity is of about 48 Kbps, and thus a transmission channel (i.e., CDM channel) can carry about 5 (=236/48) audio broadcasting channel data. Several broadcasting channel data are mixed and carried in the transmission channel through multiplexing equipment.

The CDM channel processing unit 110 can receive at least one CDM transmission channel for transmitting the broadcasting channel data stream. The deinterleaved CDM channel data output from the CDM channel processing unit 110 is output to the merge unit 120. The merge unit 120 generates a transport stream by merging the CDM channel data. As described above, since the broadcasting channel data are multiplexed through various transmission channels, the merge unit 120 generates the transport stream from the received CDM channels, and provides the transport stream to the MPEG decoder 130. The transport stream may include one or more broadcasting channel data since the merge unit 120 merges the broadcasting channel data and generates the transport stream, which includes various broadcasting channel data.

The MPEG decoder 130 extracts the broadcasting channel data from the transport stream output from the merge unit 120 according to the user's selection. If the user selects a broadcasting channel, a PID (Packet ID) corresponding to the selected broadcasting channel is provided to the MPEG decoder 130. The MPEG decoder 130 outputs the desired broadcasting channel data among the transport stream according to the selected PID. The codec 140 converts the digital signal that is the broadcasting channel data provided from the MPEG decoder 130 into an audio signal or a video signal.

Figure 2:
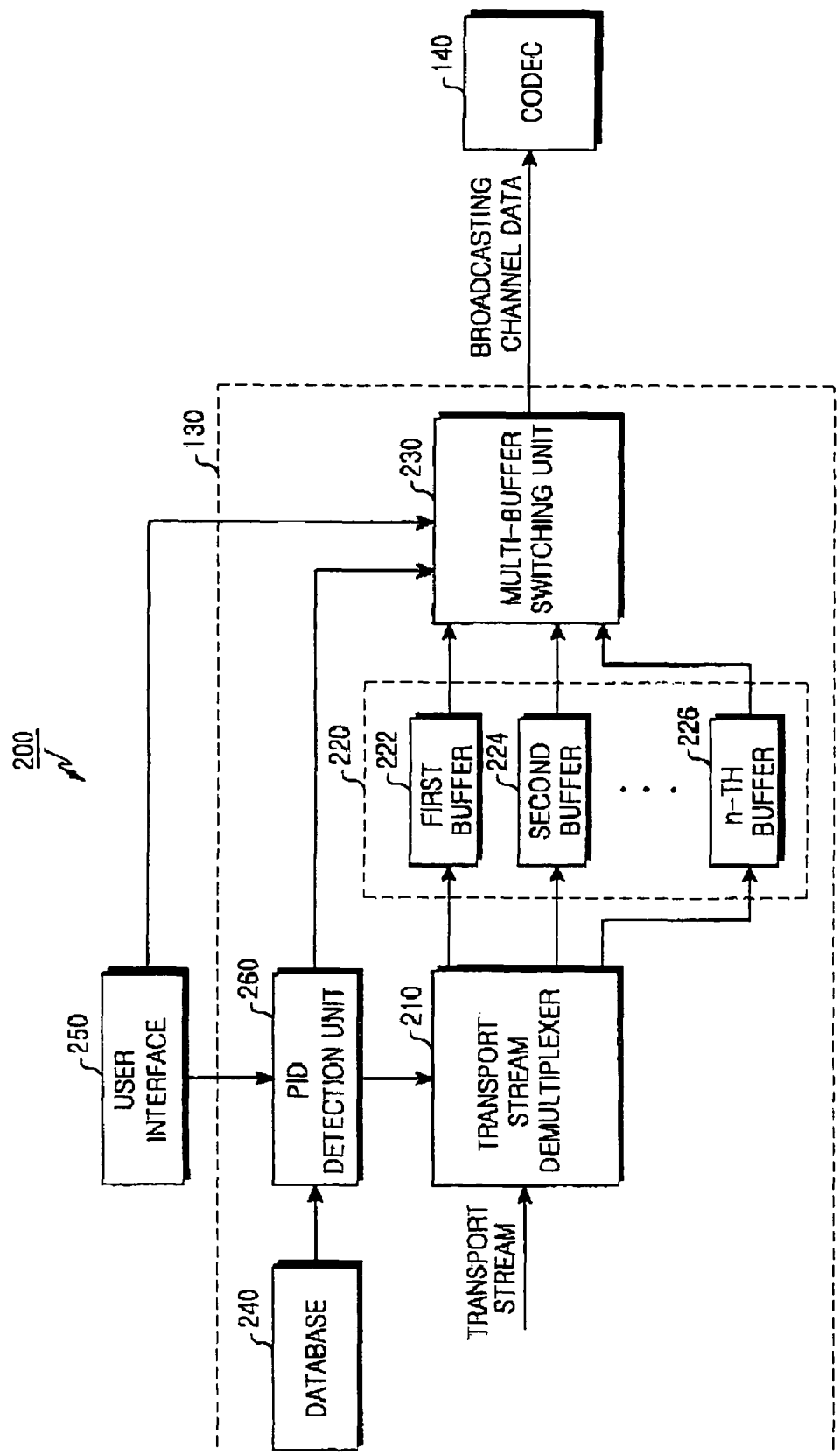
FIG. 2 is a block diagram illustrating the construction of an MPEG decoder according to an embodiment of the present invention.

FIG. 2 is a block diagram illustrating the construction of an MPEG decoder according to an embodiment of the present invention. Referring to FIG. 2, the MPEG decoder 130 includes a transport stream (TS) demultiplexer 210, a buffer unit 220, a multi-buffer switching unit 230, a database 240 and a PID detection unit 260. When receiving the digital broadcast, a transport stream in which a plurality of broadcasting channels are multiplexed is applied to the transport stream demultiplexer 210.

As described above, in the case of a satellite DMB or a digital audio broadcast that uses the transport stream, a plurality of audio broadcasting channel data are carried on one transmission channel. For example, in the case of the satellite DMB, a CDM channel has a transmission capacity of 256 Kbps, whereas the channel data rate of one audio broadcasting station is in the range of about 24 Kbps to 64 Kbps. Typically, four to six audio broadcasting channel data can be carried on a CDM channel.

In the case of receiving two multiplexed CDM channels, for example, it corresponds to the reception of 10 or more audio broadcasting channels. In effect, as described above, all the received broadcasting channel data are merged into the same transport stream by the merge unit 120, and the transport stream is transferred to the TS demultiplexer 210.

In order for the TS demultiplexer 210 to demultiplex the same transport stream into the plurality of broadcasting channel data, information about the PID allocated by broadcasting channels should be recognized. For this, the MPEG decoder 130 includes a database 240 with broadcasting channel data and corresponding information of CDM transmission channels. The structure of the database 240 is illustrated in FIG. 3.

Referring to FIG. 3, the database 240 has information about a service ID 310, a PMT (Program Map Table) PID 320, an AUD (Audio) PID 330, a CDM channel number 340, a broadcasting channel capacity 350, etc. The service ID 310 refers to information for identifying a program selected by the user. The PMT PID 320 and the AUD PID 330 refer to PSI (Program Specific Information) transmitted through the EPG channel and so on for transmitting the EPG. An EPG engine (not illustrated) may collect the PSI information and construct the database 240.

The PID detection unit 260 detects the PID from the database 240 according to the broadcasting channel selected by the user through the user interface 250. Specifically, the PID detection unit 260 receives an input of a broadcasting channel from the user interface 250. Additionally, the PID detection unit 260 can recognize the PID values related to the CDM channel presently received through the database 240. Accordingly, the PID detection unit 260 can recognize the number of all broadcasting channels existing in the present transport stream and the corresponding PID values. The PID detection unit 260 selectively arranges the PID values existing in the present transport stream and the related information on a table, and provides the table to the TS demultiplexer 210 and the multi-buffer switching unit 230. The operation of the PID detection unit 260 will now be explained in detail with reference to FIG. 4.

Figure 4:
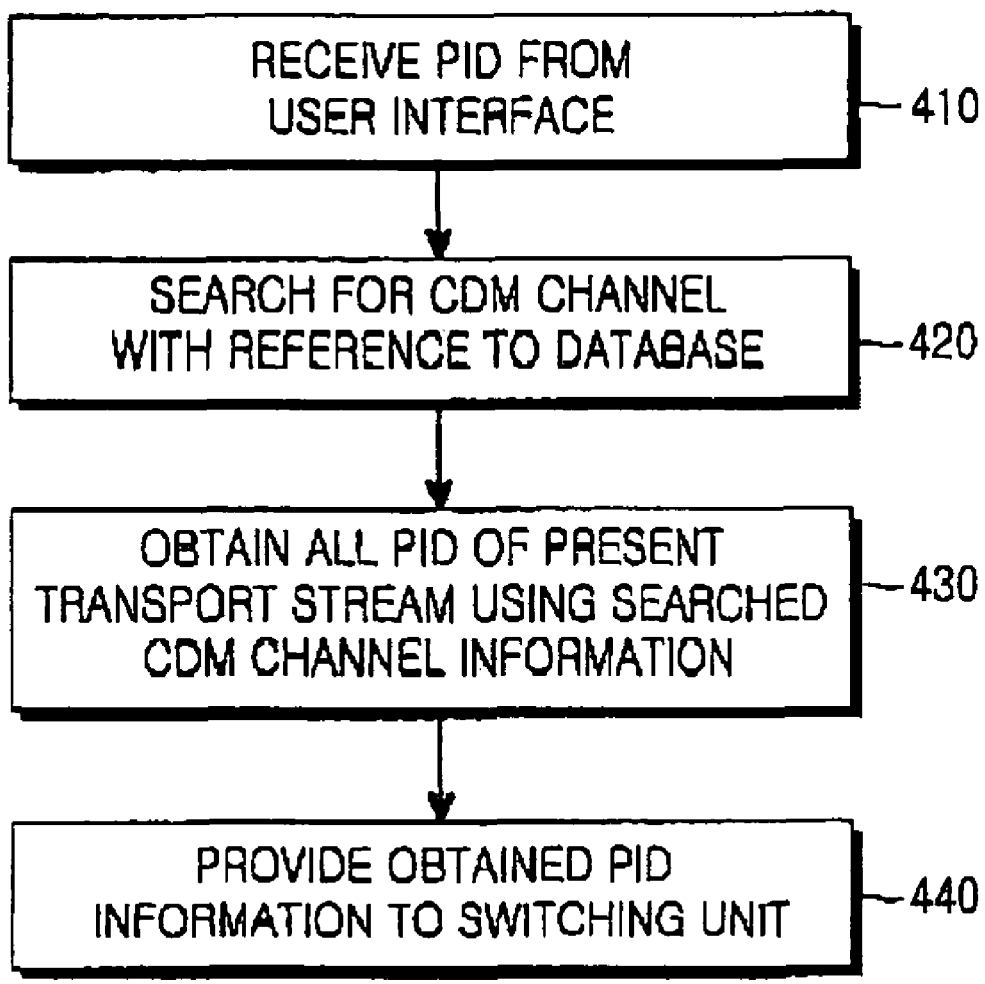
FIG. 4 is a flowchart illustrating an operation of a PID detection unit according to an embodiment of the present invention.

FIG. 4 is a flowchart illustrating an operation of a PID detection unit according to an embodiment of the present invention. Referring to FIG. 4, the PID detection unit 260 receives the PID corresponding to the broadcasting channel from the user interface at step 410. The user interface 250, if the user selects a specified broadcasting channel, provides the corresponding PID to the PID detection unit 260. Then, the PID detection unit 260 searches for the presently received CDM channel with reference to the database 240 at step 420. The PID detection unit 260 obtains all the PIDs of the present transport stream using the search results of the CDM channel information at step 430. In addition, the PID detection unit 260 determines whether the PID of the broadcasting channel selected by the user exists among the PIDs of the present transport stream. If the PID of the broadcasting channel selected by the user is one of the PIDs of the present transport stream, the PID detection unit 260 provides the corresponding PID information to the multi-buffer switching unit 230 at step 440, to make the multi-buffer switching unit 230 switch the buffer for the corresponding broadcasting channel data to the codec 140.

If the PID of the broadcasting channel selected by the user does not exist in the present transport stream, the digital broadcast receiving apparatus receives a new CDM channel. Accordingly, the PID detection unit 260 selectively arranges the PID values corresponding to the new CDM channel and the related information on a table, and provides the table to the TS demultiplexer 210 and the multi-buffer switching unit 230.

Referring again to FIG. 2, the TS demultiplexer 210 separates the transport stream into the respective broadcasting channel data with reference to the PID values provided from the PID detection unit 260, and provides the broadcasting channel data to the buffer unit 220. In this case, the TS demultiplexer 210 can allocate the respective broadcasting channel data to a plurality of ring buffers 222, 224, . . . , 226 provided in the buffer unit 220 to match their buffering capacities with reference to the bit rate information by broadcasting channels provided from the PID detection unit 260.

Specifically, the respective ring buffers 222, 224, . . . , 226 buffer the broadcasting channel data received from the TS demultiplexer. In this case, since the bit rates of the plurality of broadcasting channel data are different, the ring buffers each have unique capacities different from one anther. The capacities of the ring buffers are determined based on the bit rates. The TS demultiplexer 210 provides the respective broadcasting channel data to the plurality of ring buffers 222, 224, . . . , 226 according to the broadcasting channel bit rates.

For example, if about 10 audio broadcasting channel data have the data rate of about 512 Kbps and the respective ring buffers buffer the input broadcasting channel data for two seconds, the whole size of the buffer unit 220 becomes about 1028 Kbit (i.e., 128 Kbyte). Memory size of this scale does not impose a great burden on the digital broadcast receiving apparatus.

The respective ring buffers 222, 224, . . . , 226 output the buffered channel data to the multi-buffer switching unit 230. If the user selects a broadcasting channel, the multi-buffer switching unit 230 receives the PID information that corresponds to the broadcasting channel selected by the user from the user interface 250. The multi-buffer switching unit 230 switches one of the outputs of the plurality of ring buffers 222, 224, . . . , 226 in the buffer unit 220 to the codec 240 according to the PID information provided from the user interface 250.

As described above, according to the present invention, by simultaneously storing a plurality of broadcasting streams in the multiple ring buffers and directly switching the corresponding audio ring buffer to the codec using the pre-allocated broadcasting stream and buffer information when a broadcasting channel selection command is input, a high-speed broadcasting channel selection can be achieved.

Figure 5:
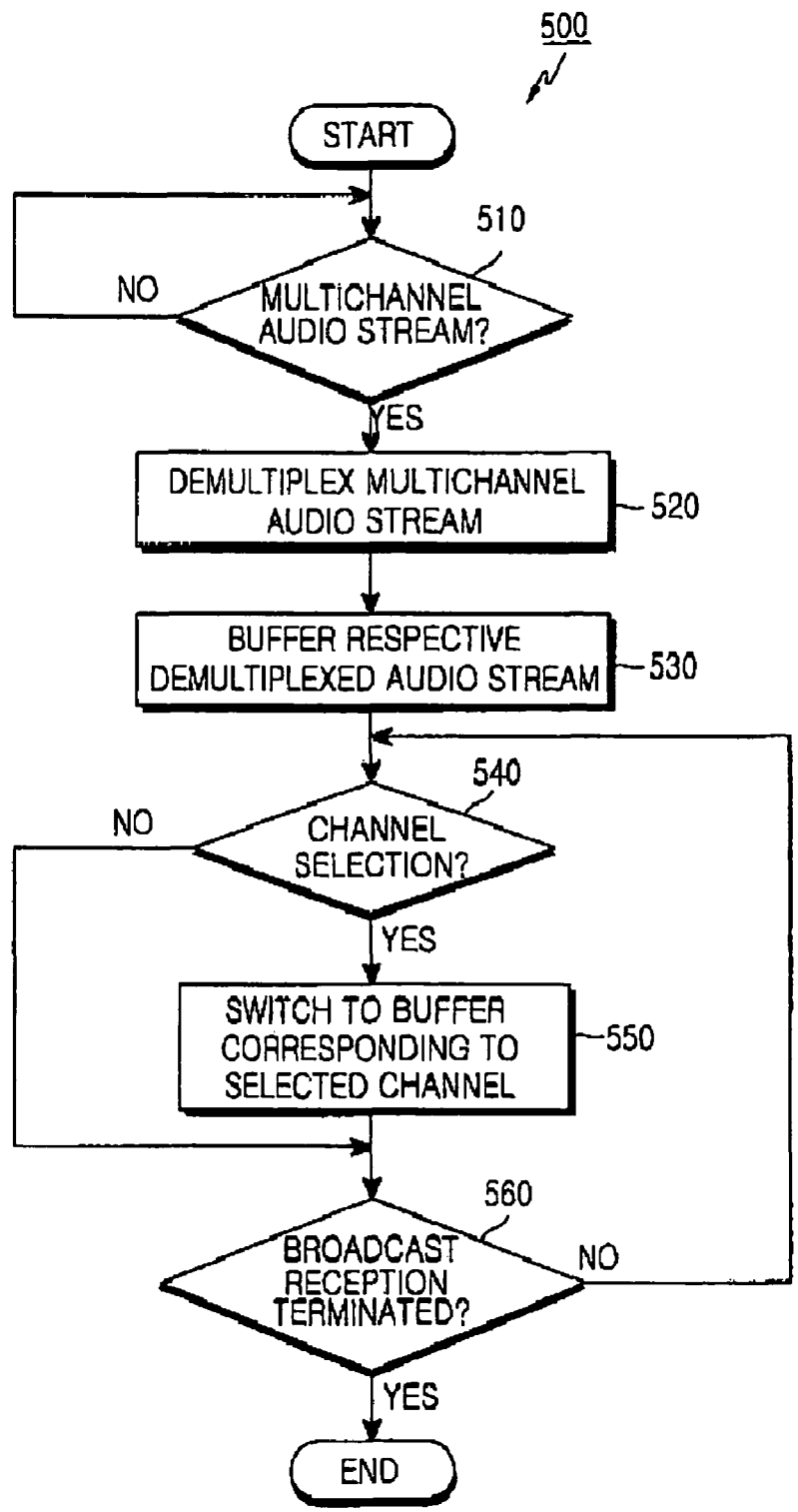
FIG. 5 is a flowchart illustrating a control flow during an audio broadcasting channel selection in a digital broadcast receiving apparatus according to an embodiment of the present invention.

FIG. 5 is a flowchart illustrating the control flow when the audio broadcasting channel is selected in the digital broadcast receiving apparatus according to an embodiment of the present invention where audio broadcasting channel is received. However, it is apparent that the present invention can also be applied to AV broadcast reception.

Referring to FIG. 5, the MPEG decoder 130 waits for the multichannel audio stream from the merge unit 120 at step 510. Once received, the MPEG decoder 130 proceeds to step 520, and inputs the received audio stream to the TS demultiplexer 210. The TS demultiplexer 210 separates the multichannel audio stream into a plurality of broadcasting channel data. Then, the MPEG decoder 130 proceeds to step 530, and provides the separated broadcasting channel data to the buffer unit 220. The respective ring buffer 222, 224, . . . , 226 of the buffer unit 220 buffers the broadcasting channel data received from the TS demultiplexer 210.

Then, the MPEG decoder 130 judges whether the user selects the broadcasting channel at step 540. If the user selects a broadcasting channel, the MPEG decoder 130 receives the PID information that corresponds to the broadcasting channel selected by the user through the user interface 250. Accordingly, the MPEG decoder 130 controls the multi-buffer switching unit 230 to switch to one of the outputs of the plurality of ring buffers 222, 224, . . . , 226 according to the PID information provided from the user interface 250 at step 550. Then, the digital broadcast receiving apparatus determines whether the reception of the digital broadcast is terminated at step 560. The digital broadcast reception may be terminated by the user at any time. In addition, the digital broadcast reception may be terminated if the digital broadcast receiving apparatus moves to a place where the digital broadcast is not received any more, or due to the discharge of a battery. If the digital broadcast reception is not terminated, the digital broadcast receiving apparatus returns to step 540.

As described above, according to the present invention, the waiting time required for broadcasting channel selection can greatly be reduced by removing the time for filling the buffer with data. Additionally, even if the buffer size is increased, it does not affect the waiting time for the broadcasting channel selection, and thus the stability of the receiving apparatus can be increased.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A digital broadcast receiving apparatus comprising:
   a user interface for outputting a Packet ID (PID) value corresponding to a broadcasting channel selected by a user;
   a database having PID values, data bit-rates, and Code Division Multiplexing (CDM) channel information;
   a PID detection unit for receiving the PID value corresponding to the broadcasting channel selected by the user, detecting a presently received CDM channel and PID values related to the presently received CDM channel, arranging the PID values and related information for the presently received CDM channel on a table, providing the table to the demultiplexer and the switching device, determining whether the PID value corresponding to the broadcasting channel selected by the user is one of the PID values related to the presently received CDM channel;

a demultiplexer for separating a multichannel transport stream of the presently received CDM channel into a plurality of broadcasting channel data based on the PID values in the table and outputting the plurality of broadcasting channel data;

a buffer unit, including a plurality of buffers having differently fixed capacities that correspond to data bit rates;

a switching device for selecting one of the plurality of buffers according to a PID value, wherein a buffer having broadcasting channel data with the PID value corresponding to the broadcasting channel selected by the user is selected when the PID value corresponding to the broadcasting channel selected by the user is one of the PID values related to the presently received CDM channel;

wherein the demultiplexer allocates each of the plurality of broadcasting channel data to a respective one of the plurality of buffers having differently fixed capacities according to a data bit rate of respective broadcasting channel data and receives a transport stream of a new CDM channel when the PID value corresponding to the broadcasting channel selected by the user is not one of the PID values related to the presently received CDM channel.

2. The apparatus as claimed in claim 1, wherein the database comprises the plurality of broadcasting channel data and corresponding information of transmission channels.

3. The apparatus as claimed in claim 1, wherein the buffers are ring buffers.

4. The apparatus as claimed in claim 3, wherein the demultiplexer allocates respective broadcasting channel data to respective ring buffers according to their channel capacities with reference to the PID values and the related information provided from the PID detection unit.

5. A digital broadcast receiving method comprising the steps of:

receiving a PID value corresponding to a broadcasting channel selected by a user;

detecting a presently received Code Division Multiplexing (CDM) channel and PID values related to the presently received CDM channel;

arranging the PID values and related information for the presently received CDM channel on a table;

separating a multichannel transport stream of the presently received CDM channel into a plurality of broadcasting channel data based on the Packet ID (PID) values in the table and outputting the broadcasting channel data;

allocating each of the plurality of broadcasting channel data separated based on the PID values to a respective one of a plurality of buffers according to a data bit rate of respective broadcasting channel data;

buffering the plurality of broadcasting channel data through the plurality of buffers having differently fixed capacities that correspond to data bit rates; and selecting an output of one of the plurality of buffers according to a PID value, wherein a buffer having broadcasting channel data with the PID value corresponding to the broadcasting channel selected by the user is selected when the PID value corresponding to the broadcasting channel selected by the user is one of the PID values related to the presently received CDM channel; and receiving a transport stream of a new CDM channel when the PID value corresponding the broadcasting channel selected by the user is not one of the PID values related to the presently received CDM channel.

* * * * *